(No Model.)
J. G. A. RHODIN.
PLATE FOR SECONDARY VOLTAIC BATTERIES.
No. 567,044. Patented Sept. 1, 1896.
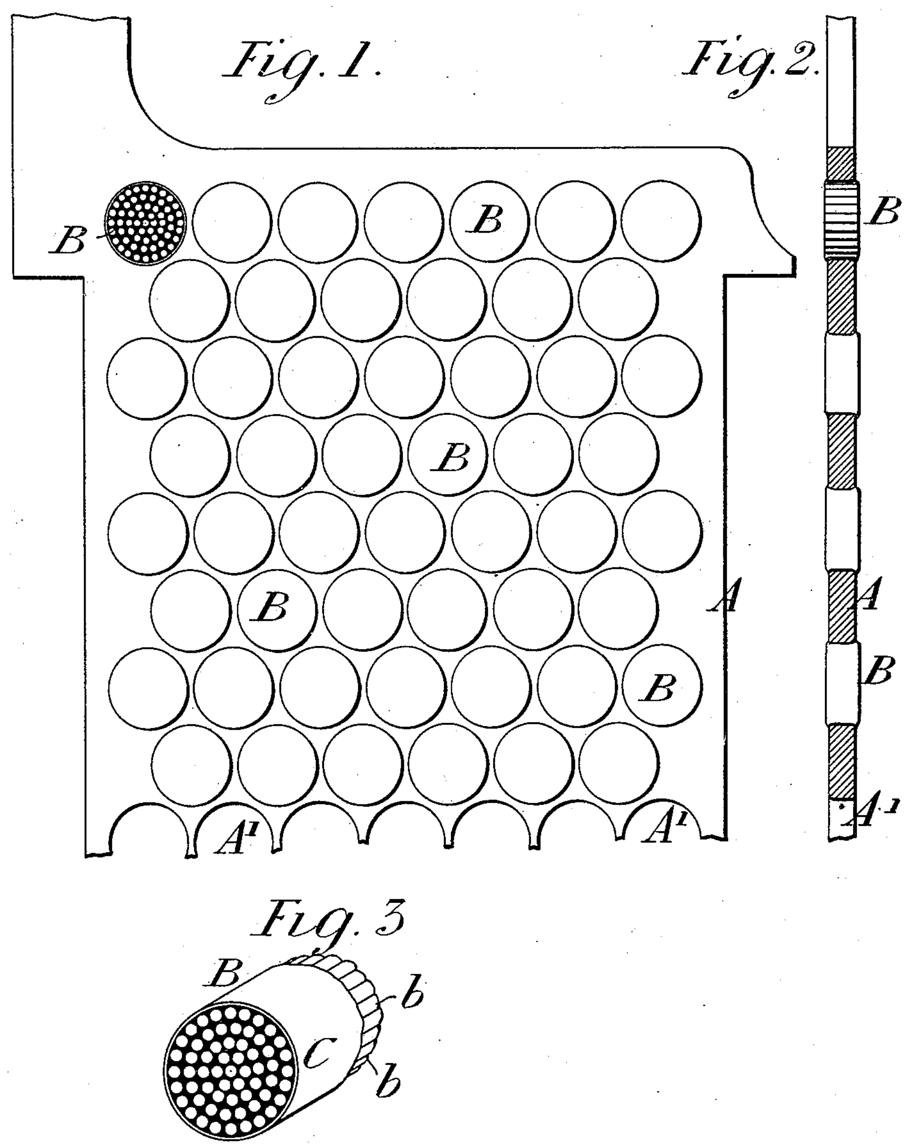
Witnesses:
Thos. A. Green
Geo. W. Rea
Inventor, John Gustaf Adolf Rhodin.
By James L. Norris, Atty.
THE NORRIS PETERS CO., PHOTO-LITHO., WASHINGTON, D. C.

UNITED STATES PATENT OFFICE.

JOHN GUSTAF ADOLF RHODIN, OF CLIFTON HALL, ENGLAND, ASSIGNOR TO THE CHLORIDE ELECTRICAL STORAGE SYNDICATE, LIMITED, OF CLIFTON JUNCTION, ENGLAND.

PLATE FOR SECONDARY VOLTAIC BATTERIES.

SPECIFICATION forming part of Letters Patent No. 567,044, dated September 1, 1896.

Application filed October 7, 1895. Serial No. 564,966. (No model.)

*To all whom it may concern:*

Be it known that I, JOHN GUSTAF ADOLF RHODIN, a citizen of England, residing at Clifton Hall, near Manchester, in the county of Lancaster, England, have invented new and useful Improvements in Plates for Secondary Voltaic Batteries, of which the following is a specification.

This invention relates to the construction of plates for secondary batteries; and it consists in the combination, with a frame-plate provided with plug-holes, of plugs composed of a bundle of lead wires filling the holes of the frame-plate and producing permeable plugs, to the interstices of which the electrolyte has access and which constitute the active material of the battery-plate. The plugs constructed in accordance with my invention have great regularity of structure and are sufficiently permeable to allow passage for the electrolyte through them and to admit of expansion without injuring the frame. They have good conducting contact with the frame which carries them and are held securely therein. According to my invention there are laid together, side by side, a number of lead wires, which are preferably inclosed within a piece of thin sheet-lead wrapped around them as a sheath, so that the whole forms a composite round rod. A frame-plate of lead alloyed with a little antimony is cast with holes through it about the same diameter as the lead rod above described. The frame-plate is laid on a flat bed. The end of the lead rod is inserted into one of the holes and cut off level with the face of the plate. This is repeated for every hole until they are all filled with short lengths of the composite rod, presenting on each side of the frame-plate the ends of the wires in the same plane with the surface of the plate. The plate thus prepared, when to be used as a positive plate, is then treated by any of the well-known methods for the formation of peroxid on the surfaces of the material constituting the lead plug, the expansion of which, due to such action, serves to secure the plug firmly in the plate. The construction of plate is equally applicable as a negative plate.

In the accompanying drawings, Figure 1 is an elevation of part of a plate constructed according to the above-described invention. Fig. 2 is a cross-section through the same; and Fig. 3 is a perspective view, a portion of the wrapping or sheathing being broken away, of one of the plugs.

In the said drawings, the reference-letter A designates the frame-plate, which is provided with holes A′, into which are introduced the plugs B, said plugs being formed, as shown in Fig. 3, of a number of lead wires placed together side by side and inclosed in a piece of thin sheet-lead C, wrapped around them. The ends of these wires *b b* may be first introduced into the holes of the frame-plate A and then cut off level with the face of the plate, the action being repeated until every hole is filled, or the composite rod made up of the separate wires may be first cut to the required length and then inserted within the holes of the frame-plate, as will be obvious. By this arrangement it will be seen that interstices are left between the wires, through which the electrolyte can pass and which will admit of the expansion of the plug without injuring the frame.

The edges of the holes A′ of the frame-plate are preferably chamfered off, as shown, to facilitate the introduction of the plugs, and also so that when the plugs expand on being acted upon by the electrolyte they will not only fill the hole tightly, but the outer end thereof will fill out the said chamfer, as shown at Fig. 2, and the plugs will thus be securely held in the holes.

Having thus described my invention, what I claim is—

A plate for secondary batteries, consisting of a perforated frame-plate, in combination with plugs composed of a bundle of lead wires filling the perforations of said frame-plate and producing permeable plugs to the interstices of which the electrolyte has access, substantially as described.

In testimony whereof I have signed my name to this specification, in the presence of two subscribing witnesses, this 29th day of August, A. D. 1895.

JOHN GUSTAF ADOLF RHODIN.

Witnesses:

HARDMAN A. EARLE,
WILL. B. WATTSON.